US009798695B2

(12) United States Patent
Ekberg et al.

(10) Patent No.: US 9,798,695 B2
(45) Date of Patent: Oct. 24, 2017

(54) ACCESS CONTROL FOR WIRELESS MEMORY

(75) Inventors: Jan-Erik Ekberg, Vantaa (FI); Jari-Jukka Harald Kaaja, Järvenpää (FI); Mikko Uusitalo, Helsinki (FI); Vesa-Veikko Luukkala, Espoo (FI); Sergey Boldyrev, Söderkulla (FI)

(73) Assignee: Nokia Technologies Oy, Espoo (FI)

( * ) Notice: Subject to any disclaimer, the term of this patent is extended or adjusted under 35 U.S.C. 154(b) by 304 days.

(21) Appl. No.: 14/414,875

(22) PCT Filed: Aug. 7, 2012

(86) PCT No.: PCT/IB2012/054027
§ 371 (c)(1),
(2), (4) Date: Apr. 26, 2015

(87) PCT Pub. No.: WO2014/023998
PCT Pub. Date: Feb. 13, 2014

(65) Prior Publication Data
US 2015/0339259 A1     Nov. 26, 2015

(51) Int. Cl.
*G06F 15/167*     (2006.01)
*H04W 8/24*     (2009.01)
(Continued)

(52) U.S. Cl.
CPC .......... *G06F 15/167* (2013.01); *G06F 3/0622* (2013.01); *G06F 3/0653* (2013.01);
(Continued)

(58) Field of Classification Search
CPC .... G06F 15/167; G06F 3/0622; G06F 3/0653; G06F 3/0679; G06F 21/62; G06F 21/79;
(Continued)

(56) References Cited

U.S. PATENT DOCUMENTS 7,139,894 B1 * 11/2006 Mensching ........... G06F 9/5016
                                                      707/999.201
7,234,063 B1      6/2007 Baugher et al.
(Continued)

FOREIGN PATENT DOCUMENTS

CA    2242833 C  *  9/2004
CN    1716220 A     1/2006
(Continued)

OTHER PUBLICATIONS

International Search Report and Written Opinion received for corresponding Patent Cooperation Treaty Application No. PCT/IB2012/054027, dated Jun. 18, 2013, 10 pages.
(Continued)

*Primary Examiner* — Kostas Katsikis
(74) *Attorney, Agent, or Firm* — Harrington & Smith (57) ABSTRACT

The specification and drawings present a new apparatus and method for access control for wireless memory. A memory controller communicating with a plurality of interfaces (at least one interface comprising a radio component for wirelessly communicating with a plurality of UE) can dynamically manage an access control to the memory by the UE and/or other users through any of the interfaces based on the preconfigured rules taking into consideration the identity of the least one interface and/or the determined directionality of the UE relative to the radio component.

20 Claims, 7 Drawing Sheets

(51) Int. Cl.
*G06F 3/06* (2006.01)
*G06F 21/62* (2013.01)
*G06F 21/79* (2013.01)
*H04W 12/08* (2009.01)
*H04W 88/02* (2009.01)

(52) U.S. Cl.
CPC ............ *G06F 3/0679* (2013.01); *G06F 21/62* (2013.01); *G06F 21/79* (2013.01); *H04W 8/24* (2013.01); *H04W 12/08* (2013.01); *G06F 2221/2143* (2013.01); *H04W 88/02* (2013.01)

(58) Field of Classification Search
CPC . G06F 2221/2143; H04W 8/24; H04W 12/08; H04W 88/02
See application file for complete search history.

(56) References Cited

U.S. PATENT DOCUMENTS

| | | | |
|---|---|---|---|
| 7,296,124 B1* | 11/2007 | Falik | G06F 13/1647 711/157 |
| 7,579,683 B1* | 8/2009 | Falik | G11C 5/02 257/678 |
| 7,676,640 B2 | 3/2010 | Chow et al. | |
| 7,725,558 B2 | 5/2010 | Dickenson | |
| 8,171,309 B1* | 5/2012 | Poo | G06F 11/3648 713/182 |
| 9,304,942 B2 | 4/2016 | Varteva et al. | |
| 2002/0133675 A1* | 9/2002 | Hirayama | G06F 3/0619 711/150 |
| 2003/0099147 A1 | 5/2003 | Deng et al. | |
| 2003/0149869 A1 | 8/2003 | Gleichauf | |
| 2004/0025052 A1* | 2/2004 | Dickenson | G06F 21/78 726/4 |
| 2004/0187001 A1 | 9/2004 | Bousis | |
| 2005/0071632 A1 | 3/2005 | Pauker et al. | |
| 2005/0097298 A1* | 5/2005 | Cohen | G06F 12/1009 711/206 |
| 2005/0125670 A1 | 6/2005 | Sozzani et al. | |
| 2005/0144353 A1 | 6/2005 | Long et al. | |
| 2005/0147245 A1 | 7/2005 | Hasan et al. | |
| 2006/0020941 A1 | 1/2006 | Inamura et al. | |
| 2006/0023625 A1* | 2/2006 | Ikawa | G06F 11/2005 370/216 |
| 2006/0062393 A1 | 3/2006 | Hsu et al. | |
| 2006/0087407 A1* | 4/2006 | Stewart | G06K 17/00 340/10.52 |
| 2006/0126850 A1 | 6/2006 | Dawson et al. | |
| 2006/0129741 A1* | 6/2006 | Hillier, III | G06F 12/0813 711/5 |
| 2006/0242429 A1 | 10/2006 | Holtzman et al. | |
| 2007/0140477 A1 | 6/2007 | Wise | |
| 2007/0147618 A1 | 6/2007 | Horn | |
| 2007/0255890 A1* | 11/2007 | Urata | G06F 12/0246 711/103 |
| 2008/0222707 A1* | 9/2008 | Pathuri | G06F 21/62 726/4 |
| 2009/0034733 A1 | 2/2009 | Raman et al. | |
| 2009/0049222 A1* | 2/2009 | Lee | G06F 13/1684 710/300 |
| 2009/0106255 A1* | 4/2009 | Lacapra | G06F 11/1076 |
| 2009/0296941 A1 | 12/2009 | Devanand et al. | |
| 2009/0300719 A1 | 12/2009 | Ferris | |
| 2009/0307407 A1 | 12/2009 | Bennett | |
| 2010/0001840 A1 | 1/2010 | Kang et al. | |
| 2010/0023747 A1* | 1/2010 | Asnaashari | G06F 21/34 713/150 |
| 2010/0034385 A1 | 2/2010 | Gantman et al. | |
| 2010/0067688 A1 | 3/2010 | Au et al. | |
| 2010/0106926 A1 | 4/2010 | Kandasamy et al. | |
| 2010/0174934 A1* | 7/2010 | Zhao | G06F 1/3203 713/324 |
| 2010/0225454 A1 | 9/2010 | Inano et al. | |
| 2011/0028091 A1 | 2/2011 | Higgins et al. | |
| 2011/0072503 A1 | 3/2011 | Tan | |
| 2011/0145590 A1 | 6/2011 | Harada et al. | |
| 2011/0187511 A1 | 8/2011 | Boldyrev et al. | |
| 2011/0197056 A1 | 8/2011 | Chen | |
| 2011/0252464 A1* | 10/2011 | Sanjeev | H04L 63/107 726/7 |
| 2011/0264906 A1 | 10/2011 | Pourzandi et al. | |
| 2012/0137043 A1* | 5/2012 | Varteva | G06F 12/1425 711/1 |
| 2012/0155633 A1 | 6/2012 | Wong et al. | |
| 2012/0271868 A1* | 10/2012 | Fukatani | G06F 3/0608 707/822 |
| 2015/0339259 A1* | 11/2015 | Ekberg | G06F 3/0622 709/213 |
| 2016/0239696 A1 | 8/2016 | Mats et al. | |

FOREIGN PATENT DOCUMENTS

| | | | |
|---|---|---|---|
| CN | 1787431 A | 6/2006 | |
| CN | 1925681 A | 3/2007 | |
| CN | 101120349 A | 2/2008 | |
| CN | 102171667 A | 8/2011 | |
| EP | 0319134 A2 * | 6/1989 | ......... G06F 12/1475 |
| EP | 1585329 A2 | 10/2005 | |
| EP | 1612671 A2 | 1/2006 | |
| EP | 1770900 A1 | 4/2007 | |
| EP | 1855231 A1 | 11/2007 | |
| EP | 1923823 A2 | 5/2008 | |
| EP | 2228942 A1 | 9/2010 | |
| FR | DK 0689701 T3 * | 3/2002 | |
| GB | 2427055 A | 12/2006 | |
| GB | 0823149 * | 1/2009 | ......... G06F 21/6218 |
| HK | GB 2466284 A * | 6/2010 | ......... G06F 21/6218 |
| JP | 09293055 A * | 11/1997 | |
| JP | 2007047863 A * | 2/2007 | |
| JP | WO 2012143976 A1 * | 10/2012 | ........... G06F 3/0608 |
| KR | 20070073153 A * | 7/2007 | ............. G06F 13/28 |
| KR | 20080086108 A * | 9/2008 | ........... G06F 3/0619 |
| WO | 94/13080 A1 | 6/1994 | |
| WO | 03088021 | 10/2003 | |
| WO | 2006/089280 A2 | 8/2006 | |
| WO | 2007/014074 A1 | 2/2007 | |
| WO | 2007/016298 A2 | 2/2007 | |
| WO | 2010/063088 A1 | 6/2010 | |
| WO | 2010/098914 A1 | 9/2010 | |
| WO | 2011/162718 A1 | 12/2011 | |

OTHER PUBLICATIONS

Notice of Allowance received for corresponding U.S. Appl. No. 13/316,932, dated May 13, 2014, 13 pages.
Halderman et al., "Privacy Management for Portable Recording Devices", Proceedings of the 2004 ACM workshop on Privacy in the electronic society, Oct. 28, 2004, pp. 16-24.
Yoon, "An Effective Resynchronization Method for Wireless Secure Sensor Network", Asia-Pacific Conference on Communications, Aug. 31- Sep. 1, 2006, 4 pages.
Office action received for corresponding Chinese Patent Application No. 201180071665.6, dated Sep. 14, 2016, 5 pages of office action and 3 pages of office action translation available.
Non-Final Office action received for corresponding U.S. Appl. No. 14/125,415, dated Sep. 22, 2016, 16 pages.
Office action received for corresponding Chinese Patent Application No. 201280075176.2, dated Oct. 8, 2016, 9 pages of office action and 4 pages of office action translation available.
Office action received for corresponding Chinese Patent Application No. 201280061049.7, dated Oct. 17, 2016, 3 pages of office action and no page of office action translation available.
"Optimized CRC Calculation", Reliable Software, Retrieved on Mar. 11, 2015, Webpage available at: http://www.relisoft.com/science/CrcOptim.html.
Shriraman et al., "Sentry: Light-Weight Auxiliary Memory Access Control", Proceedings of the 37th annual International symposium on Computer architecture, Jun. 19-23, 2010, pp. 407-418.

(56) References Cited

OTHER PUBLICATIONS

"ICODE as NFC Type ICODE Tag", AN11042, Revision 1.1, Mar. 21, 2011, 34 Pages.
Rousu, "Virtual File Repository for Mobile Phones", Thesis, 2008, 78 pages.
Mulliner et al., "Attacking NFC Mobile Phones", EUSecWest, May 2008, 71 pages.
"Germany's National Railway to Roll Out NFC Touchpoints", NFC Times, Retrieved on Jun. 18, 2016, Webpage available at : http://www.nfctimes.com/news/germany-s-deutsche-bahn-roll-out-nfc-touchpoints.
"Long-Range Wi-Fi", Wikipedia, Retrieved on Jun. 18, 2016, Webpage available at : https://en.wikipedia.org/wiki/Long-range_Wi-Fi.
"Near Field Communication", Wikipedia, Retrieved on Jun. 18, 2016, Webpage available at : https://en.wikipedia.org/wiki/Near_field_communication.
Menezes et al., "Key Transport Based on Symmetric Encryption", Handbook of Applied Cryptography, 1996, pp. 497-541.
Juels et al., "Unidirectional Key Distribution Across Time and Space With Applications to RFID Security", Proceedings of the 17th conference on Security symposium, 2008, 16 pages.
International Search Report and Written Opinion received for corresponding Patent Cooperation Treaty Application No. PCT/IB2011/052606, dated Apr. 25, 2012, 13 pages.
"File Locking", Wikipedia, Retrieved on Jun. 15, 2016, Webpage available at : https://en.wikipedia.org/wiki/File_locking.
"Locking Executing Files: Windows Does, Linux Doesn't. Why?", Stack Overflow, Retrieved on Jun. 15, 2016, Webpage available at: http://stackoverflow.com/questions/196897/locking-executing-files-windows-does-linux-doesnt-why.
International Search Report and Written Opinion received for corresponding Patent Cooperation Treaty Application No. PCT/FI2012/051208, dated Mar. 14, 2013, 11 pages.
"Billet et al., "Lightweight Privacy Preserving Authentication for RFID Using a Stream Cipher", Proceedings of the 17th international conference on Fast software encryption, 2010, 20 pages."
Extended European Search Report received for corresponding European Patent Application No. 11867958.8, dated Feb. 19, 2015, 7 pages.
Lee at al., "I2SEMS: Interconnects-Independent Security Enhanced Shared Memory Multiprocessor Systems", 16th International Conference on Parallel Architecture and Compilation Techniques, Sep. 15-19, 2007, 10 Pages.
Non-Final Office action received for corresponding U.S. Appl. No. 14/125,415, dated Mar. 12, 2015, 16 pages.
Extended European Search Report received for corresponding European Patent Application No. 12857821.8, dated Jul. 29, 2015, 7 pages.
Office action received for corresponding Chinese Patent Application No. 201180071665.6, dated Aug. 3, 2015, 14 pages of office action and 5 pages of office action translation available.
Final Office action received for corresponding U.S. Appl. No. 14/125,415, dated Sep. 17, 2015, 20 pages.
Extended European Search Report received for corresponding European Patent Application No. 12882823.3, dated Mar. 8, 2016, 6 pages.
Office action received for corresponding Chinese Patent Application No. 201280061049.7, dated Mar. 9, 2016, 5 pages of office action and no pages of office action translation available.
Office action received for corresponding Chinese Patent Application No. 201180071665.6, dated Mar. 23, 2016, 17 pages of office action and 3 pages of office action translation available.

\* cited by examiner

ACCESS CONTROL FOR WIRELESS MEMORY

RELATED APPLICATION

This application was originally filed as PCT Application No. PCT/IB2012/054027 filed Aug. 7, 2012.

TECHNICAL FIELD

The exemplary and non-limiting embodiments of this invention relate generally to memory operation, and, more specifically, relate to access control for wireless memory.

BACKGROUND

This section is intended to provide a background or context to the invention. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
AC access control
ACL access control list
AD analog-to-digital
CM coexistence manager
CR cognitive radio
DA digital-to-analog
DB data base
DCA digital signature algorithm
DIMM dual in-line memory module
DMZ demilitarized zone (perimeter networking)
DRAM dynamic random access memory
ECC elliptic curve cryptography
ID identification, identifier
JEDEC joint electron device engineering council
MMCO memory module controller
MRAM magnetic random access memory
NFC near field communication
NVM non-volatile memory
OS operations system
OTP one time programmable
PDA personal digital assistant
PCM phase change memory
RAM random access memory
RF radio frequency
RSA Rivest Shamir Adleman
R/O read only
R/W read/write
SDRAM, synchronous dynamic random access memory
SLDRAM synchronous-link DRAM
SIMM single in-line memory module
SPI serial peripheral interface (bus) SRAM static random access memory
SW software
TCM tightly coupled memory
UE user equipment Typical operation in an operating systems (OS) with access control in the operating system layer, when launching an application follows normally the following steps:

1) Process forks;
2) One of the processes asks the kernel/loader to launch a new executable;
3) The "to be loaded" binary code is read from the disk/flash and "measured";
4) The measurement is an input to the access enforcement policy; and
5) The binary code on the flash is "locked" for the duration of the execution with no R/W is allowed. This is e.g. to enable on-demand code page loading.

Figure 1:
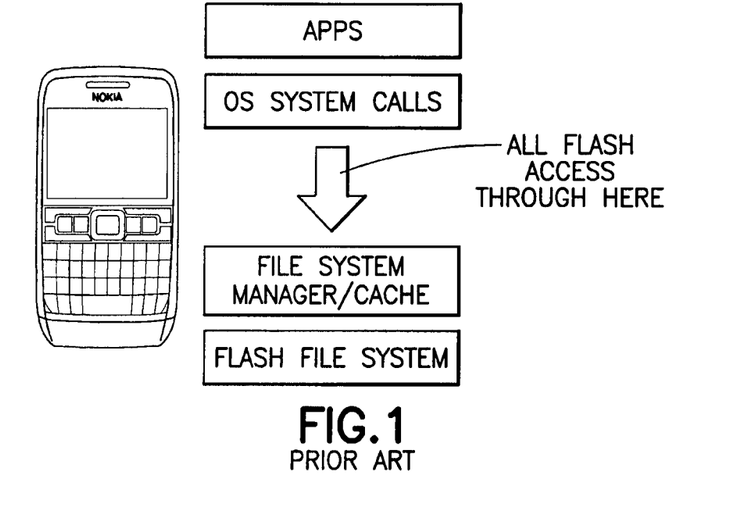
FIG. 1 is a diagram demonstrating file locking in a memory with conventional OS.

In fact, file locking is also used with OSs without access control just to enable on-demand loading of code pages as demonstrated in FIG. 1. In such cases the positional integrity of the code (and protection against deletion) is the sought-after property.

Executable protection is a form of file locking, and there are many ways of achieving that property. For example, modern versions of Linux deals with open files with reference counts, and an already running program can (seemingly) be changed, since the already running code instance is stored elsewhere until its execution terminates.

In all cases, however, this kind of file locking happens at device run-time, and is managed by the memory-based file system. It is assumed that all non-volatile memory accesses happen through the file system, and thus the locking can be enforced. The same may hold for network file systems, although the entry driver points are distributed.

SUMMARY

According to a first aspect of the invention, an apparatus, comprising: a memory comprising a plurality of segments; and a memory controller communicating with two or more interfaces, configured to dynamically manage an access control to the memory in response to a request received by the memory controller from any interface of the two or more interfaces, the access control is based on preconfigured rules defining functionality of each segment of the memory for different interfaces of the two or more interfaces using an identity of each interface as a parameter, wherein at least one interface of the two or more interfaces comprises a radio component for wirelessly communicating with a plurality of user equipments.

According to a second aspect of the invention, a method, comprising: receiving, by a memory controller of a memory from one interface of two or more interfaces, a request to access the memory, where at least one interface of the two or more interfaces comprises a radio component for wirelessly communicating with a plurality of user equipments; and providing by the memory controller an access control to the memory in response to the request based on preconfigured rules defining functionality of each segment of the memory for different interfaces of the two or more interfaces using an identity of each interface as a parameter.

According to a third aspect of the invention, an apparatus, comprising: a memory comprising a plurality of segments; and a memory controller communicating with one or more interfaces, configured to dynamically manage an access control to the memory, in response to a request received by the memory controller from at least one interface of the one or more interfaces to access the memory by a user equipment of a plurality of user equipments wirelessly communicating with the least one interface which comprises a radio component, wherein the access control to the memory of a user equipment of the plurality of user equipments is based on a determined directionality of the user equipment relative to the radio component.

According to a fourth aspect of the invention, a method, comprising:

receiving, by a memory controller of a memory from at least one interface of one or more interfaces, a request to access the memory by a user equipment of a plurality of user equipments wirelessly communicating with the least one interface which comprises a radio component; receiving by the memory controller from the radio component a directionality of the user equipment relative to the radio component determined by the radio component; and providing by the memory controller an access control to the memory in response to the request from the user equipment based on the determined directionality.

DETAILED DESCRIPTION

Figure 2:
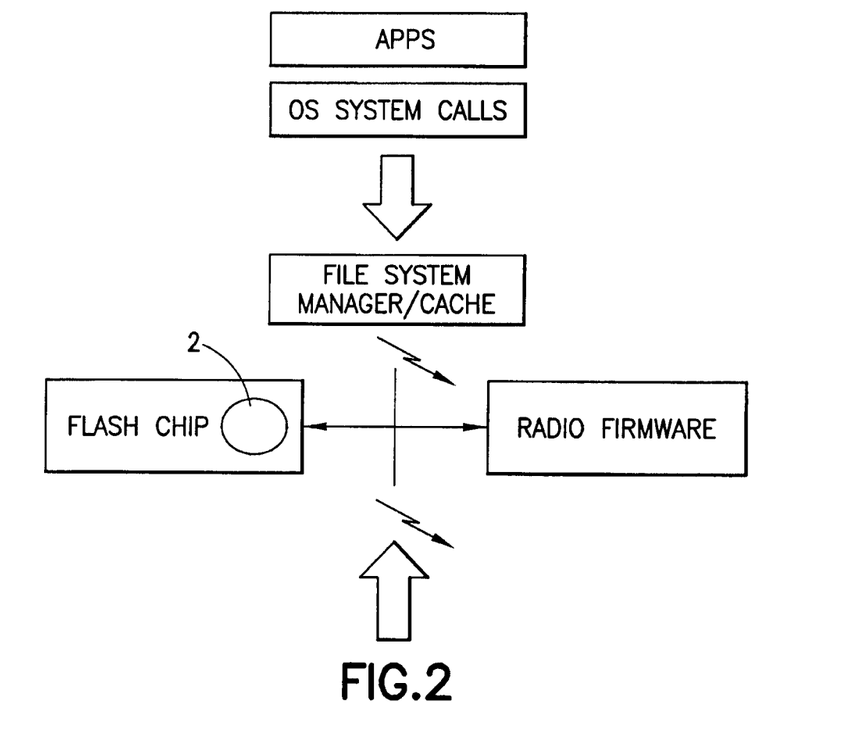
FIG. 2 is a diagram demonstrating file accessing/locking through a host device OS and independently over radio firmware, according to an exemplary embodiment of the invention.

According to embodiments of the invention, alternative ways of accessing and using memory (e.g., non-volatile memory, NVM) have been envisioned. The memory may be still accessible in the traditional way through a host device OS, but also over a radio component (radio firmware) wirelessly communicating with user equipments (UEs) in a fashion where the radio access is not channeled through the device OS as shown in FIG. 2.

Figure 3:
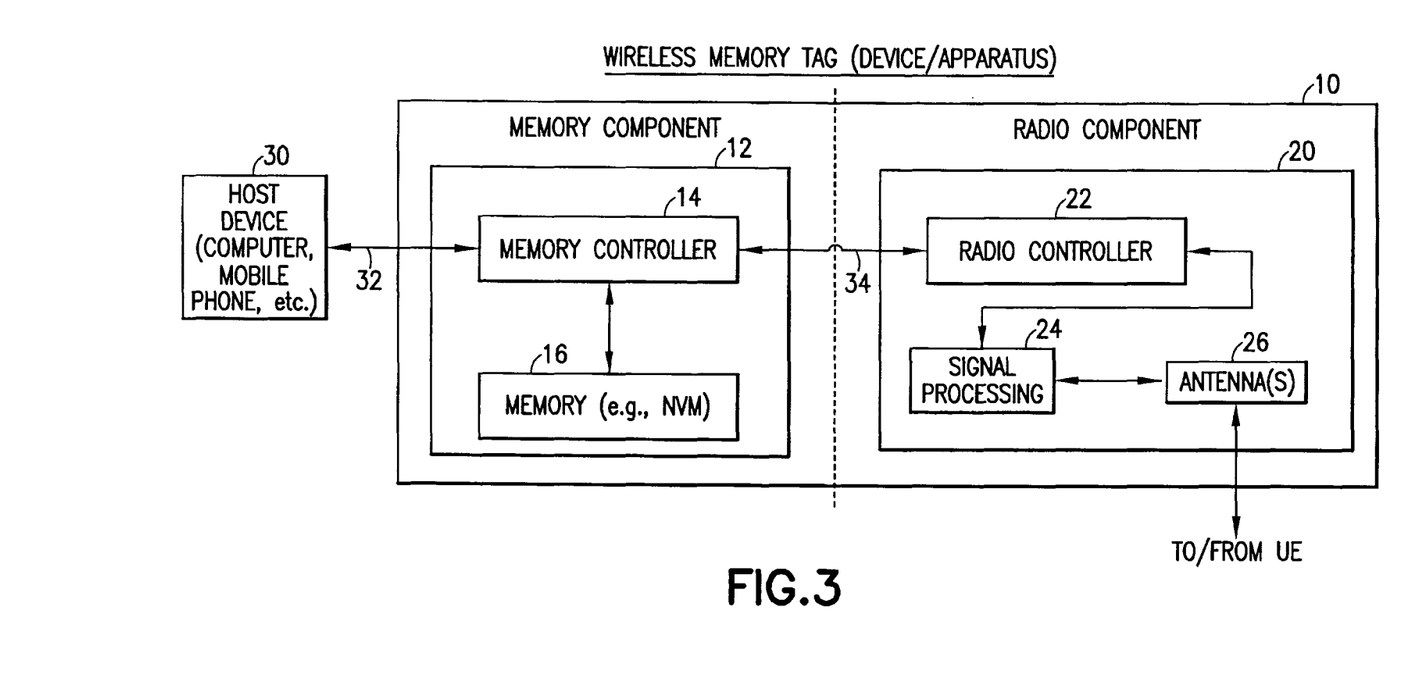
FIG. 3 is a block diagram of a wireless memory tag according to an exemplary embodiment of the invention.
Figure 4:
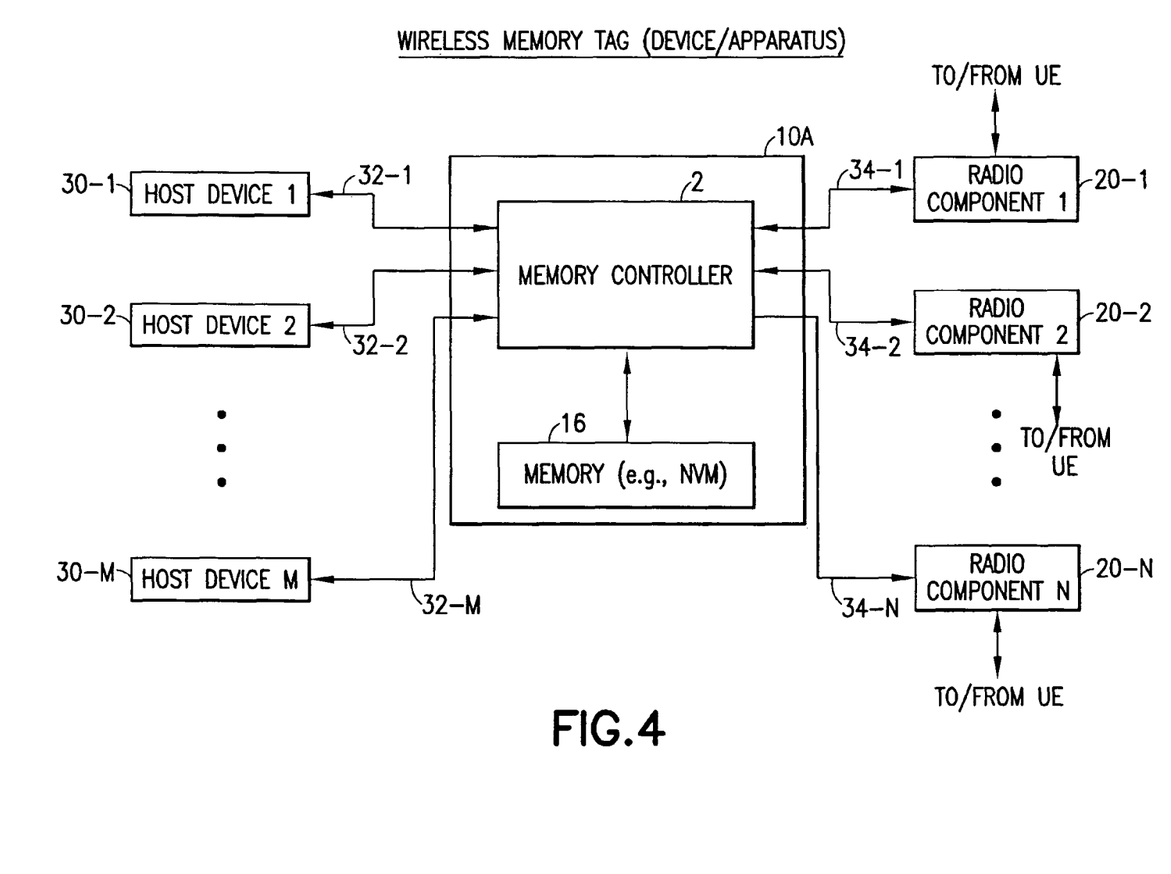
FIG. 4 is an exemplary block diagram of a wireless memory tag communicating with multiple external interfaces, according to an exemplary embodiment of the invention.

A wireless memory chip comprising the memory (e.g., NVM) may be used alone, may be imbedded in a host device such as a mobile phone/computer, or it can be integrated on the same chip with the radio components directly wirelessly communicating with the users (see FIGS. 3 and 4 for details). This creates opportunities to peruse, back up, update and modify the memory by multiple users from outside of the host phone, independently of whether the host device is powered on or off.

Providing a "dual-head" (or "multi-head" in general, see FIG. 4) memory access in this manner raises practical problems of synchronization, i.e., how the file system on the flash and possible caching can be arranged so that the flash data is not corrupted. Dual head can be arranged, for example, on a chip, or as a hardware multiplexing on a memory bus.

Flash chips today already stock simple controllers that do a fair bit of logic to protect against memory wear. This implies that they also have some amount of RAM to manage such computation.

To manage the dual-head property of the memory chip according to embodiments described herein, a small amount of RAM memory store can be added as a memory controller (such as SRAM, also known as a TCM—tightly coupled memory for the access control logic) 2 shown in FIG. 2, which may be communicating with interfaces to build locks, semaphores and other computational primitives needed to synchronize memory (e.g., flash memory) use originating from more than one source through/from the interfaces.

The file locking/access control may be performed (at the granularity of the flash chip) by using the available RAM to communicate between flash chip users and to encode a mechanism for such access control. The AC (Access Control) can simply be a set of segments that are temporarily locked by the other flash chip user, or something more complex. The temporary locking parameters can be linked to wireless memory capabilities available/required (to provide memory safety) such as speed, delay, capacity, power, performance and/or security parameters (virus checked, authentication), etc.

FIG. 3 shows an exemplary block diagram of a wireless memory tag (wireless tag, or RF memory tag) 10 which can be also called device/apparatus, according to one embodiment, where a memory component 12 and at least one radio component 20 are on the same chip. Alternatively, the radio component 20 may not be on the same chip as the memory component 12 as illustrated in an example shown in FIG. 4.

The memory component 12 in FIG. 3 comprises a memory controller (e.g., RAM-based) 2 that manages access to the physical memory 16 (including wear-leveling). The memory 16 may be a non-volatile memory (NVM) like flash/flash chip, PCM memory and the like. A flash chip can be any kind of NVM attached to the wireless memory tag 10 or embedded to any kind of wireless memory device, active or passive one.

The memory controller 2 can communicate with two (external) interfaces via link 34 and 32: one interface includes the radio component 20 (via link 34) and another interface includes a host device 30 (via link 32). Links 32 and 34 may be wired buses such as I2C bus, SPI bus (serial peripheral interface bus) and the like. In a fully integrated solution, the memory controller 2 and the radio controller 22 can merge and become one component.

The host device 30 may be a computer, a cellular phone, a digital camera, a gaming device or a PDA, as several non-limiting examples. It comprises a processor with a corresponding memory such as SDRAM (synchronous dynamic random access memory), SLDRAM (synchronous-link DRAM) or other memory types with random access capabilities, DIMM (dual in-line memory module) or SIMM single in-line memory module packages or other possible memory modules and suitable packages (e.g., typically used in personal computers) and the like. It is noted that the wireless memory tag 10 may be also incorporated (embedded) as a component (logical component) in the host device 30.

The radio component 20 comprises a radio controller (processor) 22 which manages the radio component 20, a signal processing module 24 (typically including amplifiers, AD/DA converters, digital filter, etc.) and one or more antennas 26.

The radio component 20 can be configured to wirelessly communicate with a plurality of UEs (users) such as mobile phones, computers, PDAs, etc. using NFC, BLUETOOTH, cellular networks stacks and the like. Thus, the radio component 20 can serve as a wireless interface to the memory controller 2 for providing the access by the users (user equipments) to the memory 16.

It is further noted that the memory controller 2 may use a higher authentication level for the interface with radio component 20 than for a wired interface with host device 30.

FIG. 4 demonstrates expanding the basic idea shown in FIG. 3. FIG. 4 shows an exemplary block diagram of a wireless (memory) tag 10*a* (card/device/apparatus) communicating with multiple external interfaces via corresponding links/buses, according to a further embodiment of the invention. The multiple interfaces comprise N radio components 20-1, 20-2, . . . , 20-N communicating with the memory controller 2 via links (buses) 34-1, 34-2, . . . , 34-N, and M host devices 30-1, 30-2, . . . , 30-M communicating with the memory controller 2 via links (buses) 32-1, 32-2, . . . , 32-M, where N and M are finite integers. In FIG. 4 the radio components 20-1, 20-2, . . . , 20-N are separate devices and are not on the same chip as the memory controller 2 and the memory 16.

It is further noted that the memory controller 2 may use a higher authentication level for the interfaces with radio components 20-1, 20-2, . . . , 20-N than for a wired interfaces with host devices 30-1, 30-2, . . . , 30-M.

Thus, a RAM-based access control logic module (see memory controller 2 in FIGS. 3 and 4), residing inside the memory component (e.g., in the firmware) will be consulted for all memory segment accesses. The logic will provide a general template for read and write, in the context of interface as further explained herein (see FIGS. 5-6). It will also have spare memory for a given segment that can be used to encode rights like "execute" or "edit". The editing right can operate, in the context of interface, according to the logic "first come-first served". Some key management (pairing) can be added in the memory controller 2 to further authenticate management commands/requests from wireless and/or wired interfaces.

Figure 5:
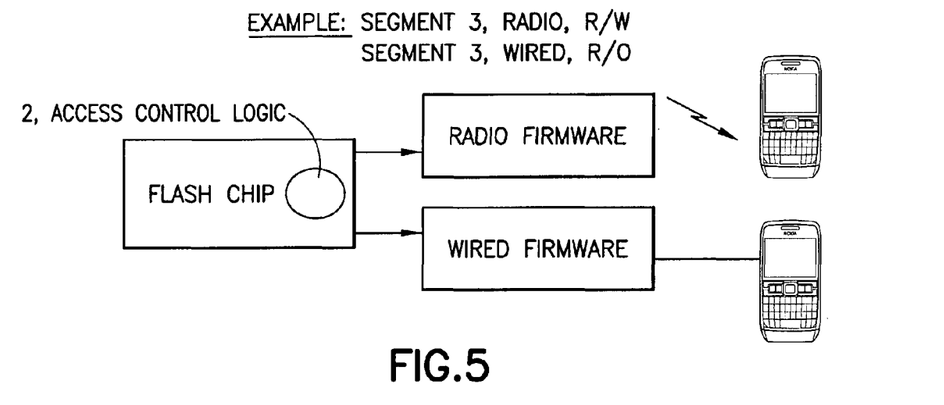
FIG. 5 is diagram demonstrating access control logic (memory controller) communicating with two interfaces comprising the radio firmware and wired firmware in the context of an interface, according to a first exemplary embodiment.

FIG. 5 shows the access control logic 2 (memory controller) communicating with two interfaces having the radio firmware (e.g., comprising the radio component 20 in FIG. 3) and wired firmware (e.g., comprising the host device 30 in FIG. 3) in the context of interface. As shown in FIG. 5, for example, for a memory segment 3, according to the access preconfigured rules, R/W operation is allowed for the command/request from the radio component/firmware interface when accessing the memory, as managed by the memory controller 2. Moreover, it is shown in FIG. 5 that for the same segment 3 only R/O operation is allowed for the command/request from the wired firmware/host device interface when accessing the memory, as also managed by the memory controller 2.

Then according to a first exemplary embodiment, the access control to the memory comprising a plurality of segments (or pages) in the context of the interface can be described as follows. A memory controller communicating with two or more interfaces (at least one interface comprises a radio component for wirelessly communicating with a plurality of UEs) may be configured to dynamically manage an access control to the memory in response to a request/command received by the memory controller from any interface of the two or more interfaces, and the access control is based on preconfigured rules defining functionality of each segment of the memory for different interfaces of the two or more interfaces using an identity of each interface as a parameter.

Figure 6:
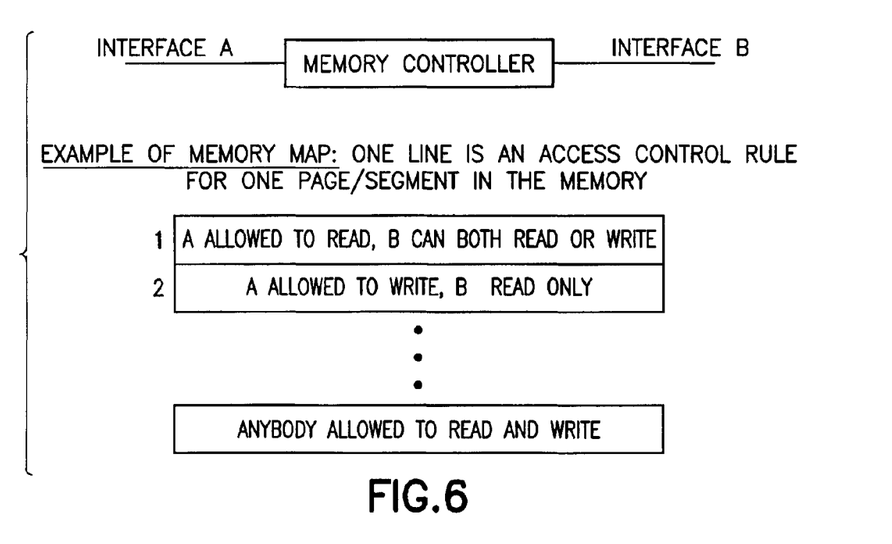
FIG. 6 is a memory map in the context of interface, according to a first exemplary embodiment.

FIG. 6 shows a further illustration of this concept. For a memory controller with two interfaces A and B, according to the preconfigured rules, for the first memory segment/page, the read operation is allowed for the interface A, and both the R/W operations are allowed for the interface B. For the second memory segment/page, the write operation is allowed for the interface A and the R/O operation is allowed for the interface B, and so on.

It is further noted, that if the component (e.g., the wireless tag) looses power, the level (according to the preconfigured rules) of access control can be reset. There may be additional, persistent, access control rule-sets added, e.g., as further described herein in reference to FIGS. 7 and 8.

Furthermore, content checking, when accessing the memory, can be provided according to a further embodiment. For example, the system may be amenable to virus checking. The first external host that captures the access control property may be allowed to configure it, and can, e.g., lock all general access down, until files have been checked against viruses, wherein files can be "opened" selectively for read-only or execute rights. Also, the system can be used for real-time backups/debugging etc. of, e.g., device system memory (i.e., the device RAM may be accessible via operating system memory management routines).

According to a second exemplary embodiment, the access control of the wireless tag (or embedded tag) may include the directionality as an attribute. This concept is demonstrated in FIG. 7 showing the access control logic 2 (memory controller) communicating with an interface comprising the radio firmware (e.g., comprising the radio component 20 in FIG. 3) wirelessly communicating with the UEs 36 and 38.

Figure 7:
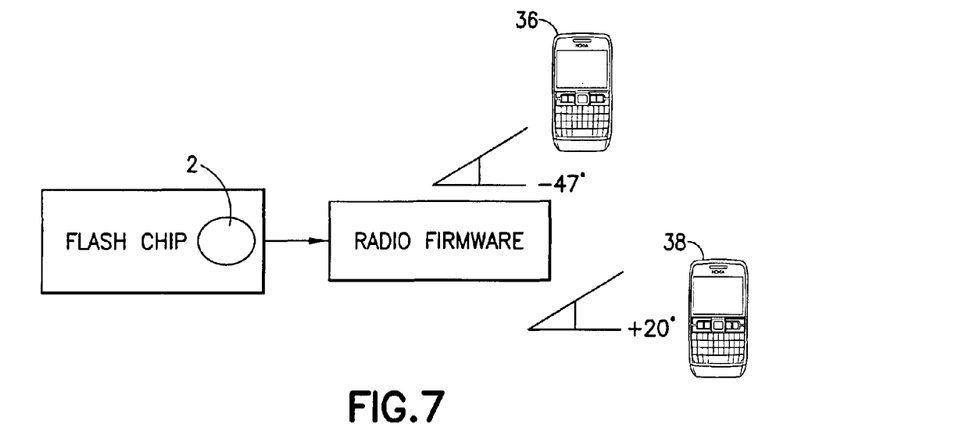
FIG. 7 is diagram demonstrating access control logic (memory controller) communicating with an interface comprising the radio firmware wirelessly communicating with UEs in the context of a directionality, according to a second exemplary embodiment.

Moreover, it is shown in FIG. 7 that the UEs 36 and 38 have angles −47° and 20° relative to the radio firmware/radio controller (and therefore the same angles with the memory controller 2). A radio system, especially one that is equipped with several antennas (two or more) can have the ability to determine signal origin direction and therefore to determine the angles indicated in FIG. 7. The directional sensitivity with multiple antennas can be based on time and phase differences in the received signal.

For example, the radio controller 22 in FIG. 3 can determine the respectful angles with/directivity of the UE wirelessly making the request to access the memory 16 and pass the determined directivity information to the memory controller 2.

Then according to a second exemplary embodiment, the access control operation to the memory comprising a plurality of segments (or pages) in the context of the directionality can be described as follows.

A memory controller communicating with one or more interfaces (at least one interface comprises a radio component for wirelessly communicating with a plurality of UEs) may be configured to dynamically manage an access control to the memory in response to a request received by the memory controller from the at least one interface (comprising the radio component) to access the memory by the UE of a plurality of user equipments wirelessly communicating with the least one interface which comprises a radio component, wherein the access control to the memory of a UE of the plurality of UEs is based on a determined directionality of the UE relative to the radio component.

Figure 8:
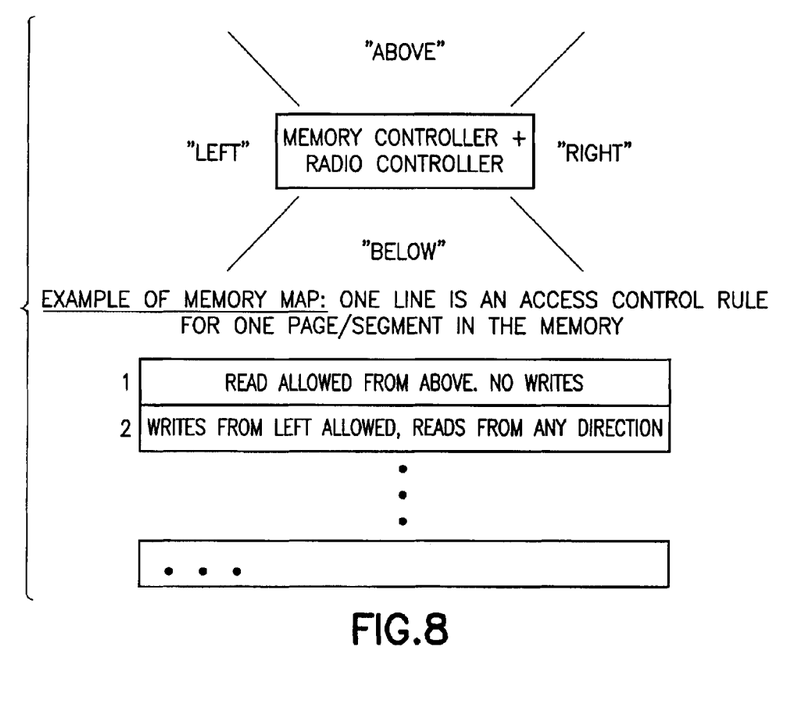
FIG. 8 is a memory map in the context of directionality, according to a second exemplary embodiment.

Thus, the memory controller is configured to use at least one segment of the memory based on a memory map for the plurality of segments constructed using the directionality as a parameter to fulfill the request from the user equipment which is further demonstrated in FIG. 8. In this example, a simplified model is used where 4 possible directions ("above", "below", "left", "right") are defined as shown for constructing the memory map. For example, for the first memory segment/page, the read operation is allowed for the direction "above" and no write operation is allowed for all directions. For the second memory segment/page, the write operation is allowed for the direction "left" and the read operation is allowed from any direction, and so on.

This example with 4 possible directions is "two-dimensional". Similarly, the access control may be configured in three directions. Instead of simple 4-direction approach, the directivity parameter can be, for example, relative angles in a 3-dimensional space (defining orientation of the wireless tag relative to the UE making memory access request).

If combined with, e.g., persistent storage, the directivity approach described herein can be used to control public tags. For example, the memory tag can be written on from inside that shop, but can only read from outside the shop window. Equally well, the angle of the connection can identify the "controlling host" from anybody else, if the memory tag, e.g., is embedded into the telephone backcover or protection cover.

Furthermore, the access control according to the second exemplary embodiment based on directivity as an attribute may be used alone as described herein or in combination with the first exemplary embodiment which utilizes the interface identity as an attribute, such that both the directionality of UEs (user devices) and the interface identity is used for constructing the memory map (i.e., combining principles used in FIGS. 6 and 8). This will allow reaching wider applicability of the methodology described herein.

Thus according to embodiments described herein, a memory controller communicating with a plurality of interfaces (at least one interface comprising a radio component for wirelessly communicating with a plurality of UE) can dynamically manage an access control to the memory by the UE and/or by other users through any of the interfaces based on the preconfigured rules taking into consideration the identity of the least one interface and/or the determined directionality of the UE relative to the radio component.

It is further noted that as a rule, the file system (e.g., ACL field Mode in Unix file system which points to shadow list of Mode) can lock access to the executable after verification, when a program is launched in a modern OS. Then the file system access to the program is forbidden (since the program is a loaded page by page on-demand). However, that dynamic control does not reside in the Mode itself since it is referring to a shadow Mode, therefore the Wireless Memory access control to the executable may not be aware of that the program is running. Therefore a program may also be interpreted, counting on the evaluation environment being fully isolated in terms of memory sharing and loaded program routines (e.g., sandboxed).

For keeping the content consistent in the wireless memory (i.e., in RF memory tags and readers/writers memories with different modes of operation with an external eTAG), the sandboxing of the memory area(s) may allow, e.g., virus check process to be performed in the right sandbox area. The wireless memory area (for two-interface case, e.g., shown in FIGS. 2, 3 and 5) may be divided into 3 areas: eTag (private, embedded tag used and available only internally), OS and RF memory areas (public area, where internally and externally from other wireless memory host or tag are allowed access). Especially the OS demanded memory area and the etag memory area may be sandboxed.

The further embodiment proposes content consistent functionality checking to be performed in the sandboxed memory area, e.g., to perform virus check for the memory area, and to be able to lock the memory area to represent content that is consistent, e.g., the memory area checked and locked to be consistent through out a certain period (for time, place, period, users etc.).

Therefore, once the Wireless Memory is mounted over RF memory tag radio stack then normal (e.g. typical) operations are carried out, as it happens in the OS.

According to exemplary embodiment, the role of the OS demanded memory area and eTag area may be reinforced to:
1. Ensure these areas are sandboxed;
2. Provide proper sanity check (e.g., check malicious program code and data access violation) during secured transfer of any content between those two areas;
3. Ensure that the content is consistent with Wireless Memory third area which is denoted as a demilitarized zone (e.g. DMZ).

It may be also beneficial at least in some cases to keep and manage a memory page table (see FIGS. 6 and 8) on the eTag memory area side.

Additionally when enlarging the used radio connectivity, this can be applied also to a cognitive area (CR, i.e., cognitive radio) related connectivity security activities: CR connectivity may apply an additional channel for device, CR DB (CR database) and Coexistence Manager (CM) can coordinate this and include related memories for flash locking setup. Certain memory areas can be restricted and/or provide the flash locking at the right CR architecture level. This will secure, with flash locking, the memory access that is available for data and control transfers.

It is further noted that the embodiments described herein can provide significant advantages, for example, an opportunity to peruse, back up, update and modify, e.g., the non-volatile memory of a mobile phone from outside the phone, independently of whether the device is powered on or off. The use cases may include but are not limited to: firmware updates, total backups/state snapshots and (software) repairs.

Figure 9:
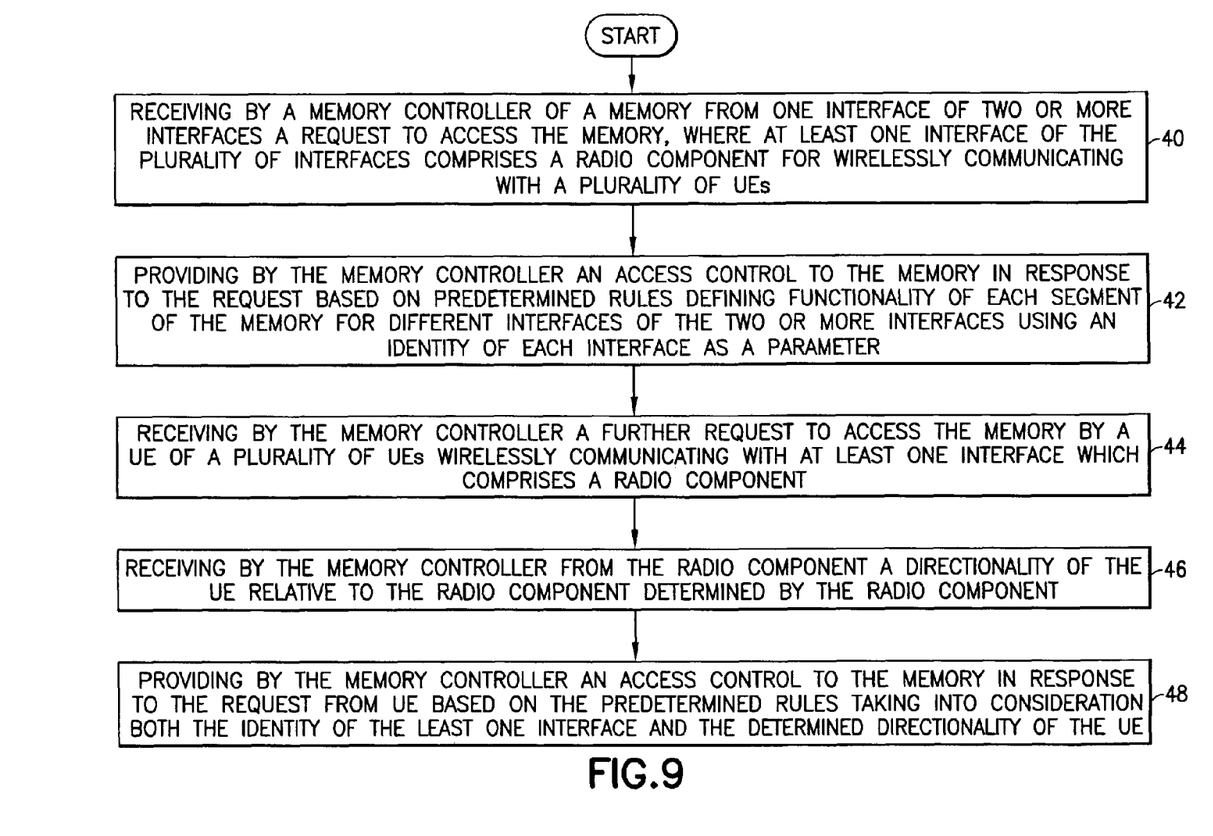
FIG. 9 is a flow chart demonstrating a first exemplary embodiment.

FIG. 9 shows a logic flow diagram/chart that illustrates the operation of a method, and a result of execution of computer program instructions embodied on a computer readable memory, further in accordance with the first exemplary embodiments of the invention as described herein. It is noted that the order of steps shown in FIG. 9 is not absolutely required, so in principle, the various steps may be performed out of the illustrated order. Also certain steps may be skipped, different steps may be added or substituted, or selected steps or groups of steps may be performed in a separate application.

In a method according to the exemplary embodiments, as shown in FIG. 9, in a first step 40, a memory controller of a memory receives from one interface of two or more interfaces a request to access the memory, where at least one interface of the plurality of interfaces comprises a radio component for wirelessly communicating with a plurality of UEs.

In a next step 42, the memory controller provides an access control to the memory in response to the request, based on preconfigured rules defining functionality of each segment of the memory for different interfaces of the two or more interfaces using an identity of each interface as a parameter.

In a next step 44, the memory controller receives a further request to access the memory by a UE of a plurality of UEs wirelessly communicating with at least one interface which comprises a radio component.

In a next step 46, the memory controller receives from the radio component a directionality of the UE relative to the radio component determined by the radio component. It is noted that steps 44 and 46 can be merged in one step.

In a next step 48, the memory controller provides an access control to the memory in response to the request from the UE based on the preconfigured rules taking into consideration both the identity of the least one interface and the determined directionality of the UE.

Figure 10:
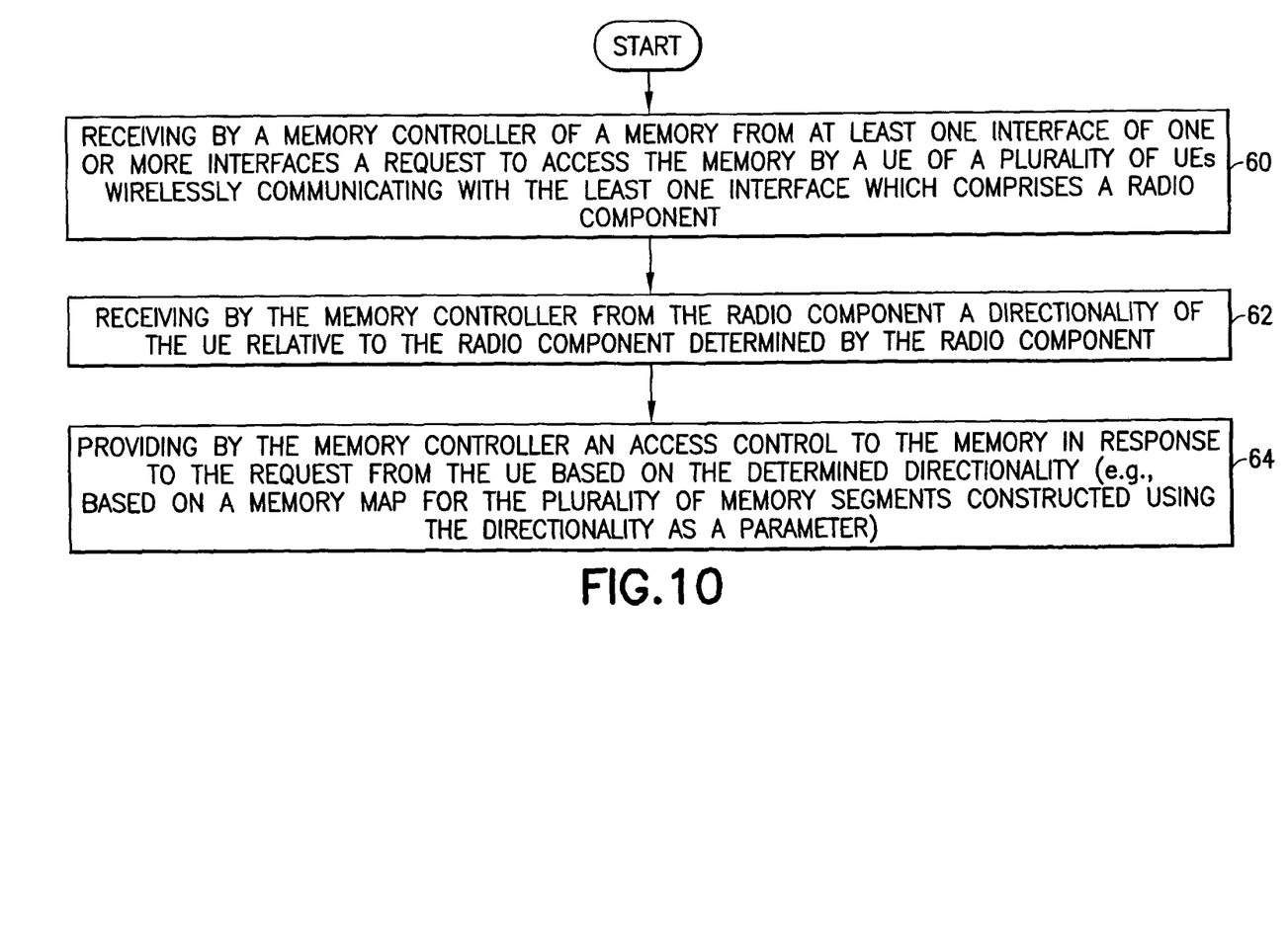
FIG. 10 is a flow chart demonstrating a second exemplary embodiment.

FIG. 10 shows a logic flow diagram/chart that illustrates the operation of a method, and a result of execution of computer program instructions embodied on a computer readable memory, further in accordance with the second exemplary embodiments of the invention as described herein. It is noted that the order of steps shown in FIG. 10 is not absolutely required, so in principle, the various steps may be performed out of the illustrated order. Also certain steps may be skipped, different steps may be added or substituted, or selected steps or groups of steps may be performed in a separate application.

In a method according to the exemplary embodiments, as shown in FIG. 10, in a first step 60, a memory controller receives from at least one interface of one or more interfaces a request to access the memory by a UE of a plurality of UEs wirelessly communicating with the least one interface which comprises a radio component.

In a next step 62, the memory controller receives from the radio component a directionality of the UE relative to the radio component determined by the radio component. It is noted that steps 60 and 62 can be merged in one step.

In a next step 64, the memory controller provides an access control to the memory in response to the request from the UE based on the determined directionality (e.g., based on a memory map for the plurality of memory segments constructed using the directionality as a parameter).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the present invention. Numerous modifications and alternative arrangements may be devised by those skilled in the art without departing from the scope of the invention, and the appended claims are intended to cover such modifications and arrangements.

What is claimed is:

1. An apparatus, comprising:
   at least one processor; and
   at least one memory including computer program code, where the at least one memory and the computer program code are configured, with the at least one processor, to cause the apparatus to at least:
   communicate with two or more interfaces to dynamically manage an access control to a memory chip connected to the apparatus in response to a request to access the memory chip received from a user equipment of a plurality of user equipment over an interface of the two or more interfaces, the wherein the memory chip comprises a plurality of segments; and
   in response to the request, provide access to at least one segment of the memory chip using a memory map of the at least one segment, wherein the memory map is based on preconfigured rules defining functionality of each segment of the memory chip for the interface using an identity of the interface and a directionality of the user equipment relative to the interface as a parameter, wherein at least one interface of the two or more interfaces comprises a radio component for wirelessly communicating with the plurality of user equipment.

2. The apparatus of claim 1, wherein the request is provided wirelessly to the at least one interface, and the directionality being determined by the radio component.

3. The apparatus of claim 1, wherein the request comprises a reading or writing operation.

4. The apparatus of claim 1, wherein the memory chip is a non-volatile memory chip.

5. The apparatus of claim 1, wherein the apparatus comprises the radio component.

6. The apparatus of claim 1, wherein the at least one memory including the computer program code is configured with the at least one processor to cause the apparatus to use an authentication level for the at least one interface higher than for a wired interface comprised among the two or more interfaces.

7. A method, comprising:
receiving, by an apparatus, from a user equipment of a plurality of user equipment over at least one interface of two or more interfaces, a request to access a memory chip connected to the apparatus, wherein the memory chip comprises a plurality of segments, wherein the at least one interface of the two or more interfaces comprises a radio component for wirelessly communicating with the plurality of user equipment; and
providing, by the apparatus, access to at least one segment of the memory chip in response to the request using a memory map of the at least one segment, wherein the memory map is based on preconfigured rules defining functionality of each segment of the plurality of segments of the memory chip for the at least one interface using an identity of the interface and a directionality of the user equipment relative to the at least one interface as a parameter.

8. The method of claim 7, further comprising:
providing, access to the memory, in response to the request from the user equipment based on the preconfigured rules taking into consideration both an identity of the least one interface and the determined directionality of the user equipment.

9. The method of claim 7, wherein the request comprises a reading or writing operation.

10. The method of claim 7, wherein the at least one interface comprises the radio component.

11. The method of claim 7, wherein the one or more interfaces comprises at least one wired interface in addition to the at least one interface.

12. The method of claim 11, wherein an authentication level for the at least one interface is higher than for the at least one wired interface.

13. The method of claim 7, wherein the two or more interfaces comprises at least two interfaces having radio components.

14. An apparatus, comprising:
at least one processor; and
at least one memory including computer program code, where the at least one memory and the computer program code are configured, with the at least one processor, to cause the apparatus to at least:
dynamically manage an access control to a memory chip connected to the apparatus, in response to a request received over at least one interface of one or more interfaces to access the memory chip by a user equipment of a plurality of user equipment wirelessly communicating with the least one interface which comprises a radio component, wherein the memory chip comprises a plurality of segments; and
provide access to at least one segment of the memory chip by the user equipment using a memory map of the at least one segment, wherein the memory map is based on preconfigured rules defining functionality of each segment of the plurality of segments of the memory chip for the at least one interface using an identity of the interface and on a determined directionality of the user equipment relative to the radio component.

15. The apparatus of claim 14, wherein the at least one memory including the computer program code is configured with the at least one processor to cause the apparatus, based on said determined directionality, to use at least one segment of the memory based on a memory map for the plurality of segments constructed using the directionality as a parameter to fulfill the request from the user equipment.

16. The apparatus of claim 14, wherein the corresponding request comprises a reading or writing operation.

17. The apparatus of claim 14, wherein the memory is a non-volatile memory.

18. The apparatus of claim 14, wherein the apparatus has two or more antennas and wherein the at least one memory including the computer program code is configured with the at least one processor to cause the apparatus to determine the directionality of the user equipment.

19. The apparatus of claim 14, wherein the at least one memory including the computer program code is configured with the at least one processor to cause the apparatus to use an authentication level for the at least one interface higher than for a wired interface comprised among the one or more interfaces.

20. The apparatus of claim 14, wherein the one or more interfaces comprises at least one wired interface in addition to the at least one interface or at least two interfaces, where the at least one memory including the computer program code is configured with the at least one processor to cause the apparatus to provide the access control to the memory further based on preconfigured rules defining functionality of each segment of the memory for different interfaces using an identity of each interface as a parameter.

* * * * *

UNITED STATES PATENT AND TRADEMARK OFFICE
CERTIFICATE OF CORRECTION

PATENT NO. : 9,798,695 B2
APPLICATION NO. : 14/414875
DATED : October 24, 2017
INVENTOR(S) : Ekberg et al.

Page 1 of 1

It is certified that error appears in the above-identified patent and that said Letters Patent is hereby corrected as shown below:

In the Claims

Claim 1, Column 10, Line 40 "the" should be deleted in between "interfaces" and "wherein".

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*